United States Patent
Sekiyama

(10) Patent No.: US 9,151,674 B2
(45) Date of Patent: Oct. 6, 2015

(54) WAVELENGTH DISTRIBUTION MEASURING APPARATUS

(75) Inventor: Kentaro Sekiyama, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 174 days.

(21) Appl. No.: 13/545,486

(22) Filed: Jul. 10, 2012

(65) Prior Publication Data

US 2013/0027696 A1 Jan. 31, 2013

(30) Foreign Application Priority Data

Jul. 26, 2011 (JP) ................... 2011-163594

(51) Int. Cl.
*G01J 3/00* (2006.01)
*G01J 3/51* (2006.01)
*G01J 3/02* (2006.01)
*G02B 21/36* (2006.01)

(52) U.S. Cl.
CPC ............... *G01J 3/513* (2013.01); *G01J 3/0205* (2013.01); *G01J 3/0216* (2013.01); *G02B 21/365* (2013.01)

(58) Field of Classification Search
CPC ........................................................ G01J 3/0205
USPC ............................................................ 356/300
See application file for complete search history.

(56) References Cited

U.S. PATENT DOCUMENTS

| | | | | |
|---|---|---|---|---|
| 3,981,590 A | * | 9/1976 | Perkins | 356/407 |
| 6,272,269 B1 | * | 8/2001 | Naum | 385/43 |
| 6,704,092 B2 | * | 3/2004 | Shiraishi | 355/53 |
| 2006/0250597 A1 | * | 11/2006 | Nakajima | 355/55 |

FOREIGN PATENT DOCUMENTS

| | | |
|---|---|---|
| JP | H04-276526 A | 10/1992 |
| JP | H06-273232 A | 9/1994 |
| JP | 2006-511836 A | 4/2006 |
| JP | 2008-096777 A | 4/2008 |
| JP | 2010-139446 A | 6/2010 |

OTHER PUBLICATIONS

Japanese Office Action dated Jan. 27, 2015 from related Japanese Patent Application No. 2011-163594, together with an English language translation.

* cited by examiner

*Primary Examiner* — Tarifur Chowdhury
*Assistant Examiner* — Omar Nixon
(74) *Attorney, Agent, or Firm* — Scully, Scott, Murphy & Presser, PC

(57) ABSTRACT

Provided is a wavelength distribution measuring apparatus (24), which includes a diffuser plate (52) for dispersing light beams radiated from an object to be measured (11) and a light beam homogenizing optical element (53) for reflecting, by the side surface (53b), at least part of the light beams dispersed by the diffuser plate (52) so that the light beams approximate to the direction of the perpendicular of a light receiving surface and also for guiding the light beams to the light receiving surface, and an optical receiver (56) including a plurality of light receiving elements for detecting the light beams, the light receiving elements being different from one another in spectral sensitivity characteristic. With this configuration, substantially parallel light beams radiated from the object to be measured (11) are homogenized at the light receiving surface including the periphery of the light receiving surface.

12 Claims, 7 Drawing Sheets

WAVELENGTH DISTRIBUTION MEASURING APPARATUS

CROSS-REFERENCE TO RELATED APPLICATION

The present application claims priority from Japanese Application No. 2011-163594, filed on Jul. 26, 2011, the content of which is incorporated herein by reference.

BACKGROUND OF THE INVENTION

1. Field of the Invention

The present invention relates to a wavelength distribution measuring apparatus for homogenizing light dispersed from a predetermined region of an object to be measured, to thereby detect wavelength distribution characteristics.

2. Description of the Related Art

A colorimeter is one of the measuring apparatuses for measuring the spectrum of light beams radiated from an object to be measured. A colorimeter is an apparatus for numerically measuring color information, and used for inspecting the color quality of industrial products and goods in various fields such as automobile, foods, printing, and the like, and for performing color correction in a microscope.

There is known a colorimeter which has an optical system for uniformizing light beams radiated from a predetermined region on an object to be measured and irradiating the light beams onto an optical sensor including a color filter transmitting different wavelength components and a plurality of light receiving elements such as CCD and CMOS. There are various optical systems for a colorimeter which uses a plurality of light receiving elements to perform measurement.

As an optical system for homogenizing light beams, there are known an optical system including an optical fiber (see, for example, JP H06-273232 A) and an optical system including a light beam homogenizing optical element such as a light pipe (see, for example, JP 2008-096777 A). Light beams are reflected a plurality of times by the inside surface of the light beam homogenizing optical element, to thereby homogenize illuminance distribution of the light beams, so that an optical sensor can be irradiated with homogenous light beams.

On the other hand, when a microscope is used to measure a spectrum of light beams, a specimen may be enlarged via an objective lens to form an intermediate image, and the intermediate image thus formed may be defined as a field of measurement. In this case, the enlarged image of the specimen serves as a field of measurement, and therefore, the divergent light beams from the specimen have a smaller numerical aperture (NA) in the field of measurement, and often approximate to parallel light beams. When such light beams are made incident on the light beam homogenizing optical element, there arises a problem that the light beam homogenizing optical element needs to be increased in length in order to homogenize the light beams through reflections by the inside surface of the light beam homogenizing optical element.

In view of the above, a diffuser plate is disposed between the field of measurement and the light beam homogenizing optical element. The diffuser plate allows substantially parallel light beams to be converted into divergent light beams, to thereby reduce the total length of the light beam homogenizing optical element, which makes it possible to attain size reduction of the apparatus.

SUMMARY OF THE INVENTION

A wavelength distribution measuring apparatus according to the present invention includes:

a diffuser plate for dispersing light beams radiated from a field of measurement;

an optical receiver including a plurality of light receiving elements disposed on a light receiving surface, the light receiving elements being different from one another in spectral sensitivity characteristic; and a light beam homogenizing optical element for deflecting at least part of the light beams dispersed by the diffuser plate so that the light beams approximate to the direction of the perpendicular of the light receiving surface and also for guiding the light beams to the light receiving surface.

The light beam homogenizing optical element may preferably include:

an incidence plane on which the light beams dispersed by the diffuser plate is incident;

an exit plane through which the light beams incident from the incidence plane is exited toward the optical receiver; and a side surface for internally reflecting at least part of the light beams incident from the incidence plane.

More preferably, the incidence plane is larger in area than the exit plane in the light beam homogenizing optical element.

Further, the side surface of the light beam homogenizing optical element may preferably be formed of, at least in part thereof, a planar surface.

Further, the incidence plane and the exit plane of the light beam homogenizing optical element each may be circular and rectangular in shape, respectively.

Further, at least part of the side surface of the light beam homogenizing optical element may be parallel to the direction of the perpendicular of the light receiving surface.

The light beam homogenizing optical element may be configured to be continuously changed in shape in cross-section parallel to the light receiving surface, between the incidence plane and the exit plane.

Alternatively, the light beam homogenizing optical element may include at least a first portion and a second portion which are connected to each other across a step.

Further, the light receiving elements of the optical receiver may preferably be arranged two-dimensionally.

Preferably, the light receiving elements are formed of photoelectric conversion elements and filters disposed in proximity to the front surface of the photoelectric conversion elements, the filters being different from one another in passband characteristics.

Further, the wavelength distribution measuring apparatus according to claim 1 may include a characteristic deriving unit for deriving wavelength characteristics of the light beams, based on output signals from the light receiving elements.

Further, the light beam homogenizing optical element may preferably have a tapered portion which is larger on the exit plane side than the incidence plane side in predetermined cross-section including the perpendicular of the light receiving surface of the optical receiver; and the light beam homogenizing optical element may preferably satisfy the following relation:

$$a \sin(\sin \theta_{in}/n) > \alpha,$$

in which $\theta_{in}$ represents an angle of the intensity distribution at half width at half maximum relative to the divergence angle of the light beams dispersed by the diffuser plate, n represents a refractive index of the light beam homogenizing optical element, and a represents a taper angle of the light beam homogenizing optical element.

BEST MODES FOR CARRYING OUT THE INVENTION

In the following, embodiments of the present invention are described with reference to the drawings.

First Embodiment

Figure 1:
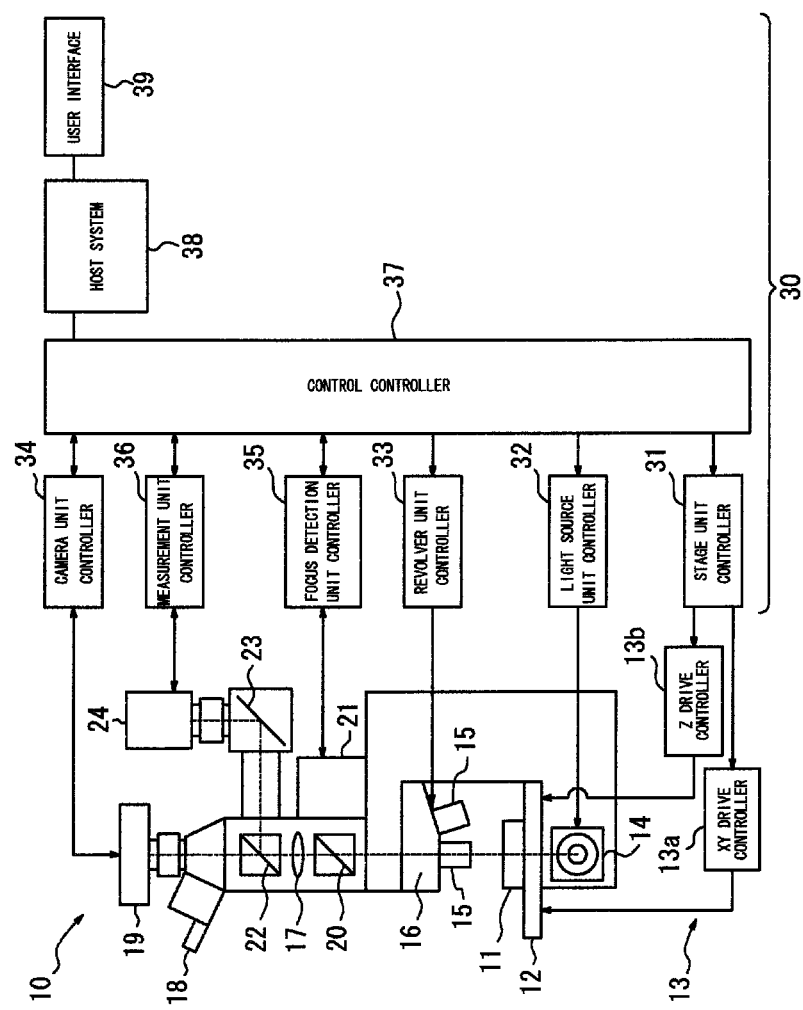
FIG. 1 is a schematic configuration diagram of a microscope applied with a wavelength distribution measuring apparatus according to a first embodiment of the present invention.

FIG. 1 is a schematic configuration diagram of a microscope applied with a wavelength distribution measuring apparatus according to a first embodiment of the present invention. The microscope 10 is a transmission optical microscope.

The microscope 10 is configured by including: a stage unit 13 including a stage 12 on which an object to be measured 11 is placed; a light source unit 14 for illuminating the object to be measured 11; a revolver unit 16 equipped with a plurality of objective lenses 15; an imaging lens 17 for causing light that has passed through the objective lens 15 to form an intermediate image; an eyepiece 18 for allowing a user to visually observe the object to be measured 11 therethrough; and a camera unit 19 attached to a cylindrical portion for taking an image of the object to be measured. The camera unit 19 may be attached to the eyepiece 18. Alternatively, the object to be measured 11 may be observed merely through an image taken by the camera unit.

A half mirror 20 is provided between the objective lens 15 and the imaging lens 17, so that light beams from the object to be measured 11 are diverged in part to be incident on the focus detection unit 21. Further, a half mirror 22 is provided between the imaging lens 17 and the eyepiece 18 or the camera unit 19, so that light beams from the object to be measured 11 are diverged in part to be incident on a measurement unit 24 via a mirror 23. Instead of the half mirrors 20 and 22, for example, a prism or a beam splitter may also be used as long as light beams can be diverged thereby. Further, it is not always necessary to provide the mirror 23.

The stage unit 13 includes: the stage 12; an XY drive mechanism (not shown) and a Z drive mechanism (not shown) for driving the object to be measured 11 placed on the stage 12, without changing the orientation thereof; and an XY drive controller 13a and a Z drive controller 13b each for controlling the XY drive mechanism and the Z drive mechanism, respectively. Here, the optical axis direction of the objective lens 15 is defined as Z direction, and a plane perpendicular to the Z direction is defined as XY plane. With this configuration, the stage 13 can be freely movable in the XYZ directions. The XY drive controller 13a detects a predetermined origin position of the stage in the XY plane by means of an XY position origin sensor (not shown), and controls a drive amount of a motor with reference to the origin position as a base point, to thereby move an observation field of the object to be measured. The Z drive controller 13b detects a predetermined origin position of the stage in the Z direction by means of a Z position origin sensor (not shown), and controls a drive amount of a motor with reference to the origin position as a base point, to thereby move the object to be measured to an arbitrary Z position within a predetermined range of height for focusing.

The light source unit 14 is a white light source for illuminating the object to be measured placed on the stage 12 from below the stage 12 through an opening portion of the stage 12. A halogen lamp or the like may be employed for the light source unit 14. Light that has been emitted from the light source unit 14 and passed through the object to be measured 11 is incident on the objective lens 15 as observation light. The revolver unit 16 includes a rotatable revolver equipped with a plurality of the objective lenses 15 which are different from one another in magnification. The revolver is rotated so as to freely interchange the objective lens 15 to be used, to thereby change the magnification (observation magnification) of the objective lens. The focus detection unit 21 detects a focus position, based on the diverged light beams from the object to be measured 11. Further, the measurement unit 24 obtains information on the color or the spectrum of the object to be measured 11. The detailed configuration of the measurement unit 24 is described later.

Further, the microscope 10 includes, as a control/data processing section 30: a stage unit controller 31; a light source unit controller 32; a revolver unit controller 33; a camera unit controller 34; a focus detection unit controller 35; a measurement unit controller 36; a control controller 37; a host system 38; and a user interface 39.

The stage unit controller 31 controls the XY drive controller 13a and the Z drive controller 13b, to thereby control the position of the object to be measured 11. The light source control unit 32 controls the light source unit 14, to thereby adjust the amount of illuminating light emitted from the light source unit 14. The revolver unit controller 33 rotates the revolver of the revolver unit 16, to thereby interchange the objective lenses. The focus detection unit controller 35 controls the focus detection unit 21, to thereby acquire information on the focus position of the microscope 10. The measurement unit controller 36 controls the measurement unit 24, to thereby receive, as an electric signal, the wavelength distribution characteristic in a predetermined region on the object to be measured 11.

The control controller 37 performs overall control over the operations of the components forming the microscope device 10, under the control from the host system 38. For example, the control controller 37 makes adjustments to the components in the microscope in association with the observation of the object to be measured 11 by performing processing of rotating the revolver so as to interchange the objective lenses 15 to be placed on the optical path of the observation light, performing light control of the light source and switching the various optical elements according to the magnification of the objective lens thus interchanged, and giving instructions to the XY drive controller 13a and the Z drive controller 13b to move the stage. The control controller 37 also notifies, as appropriate, the host system 38 of the statuses of the components.

Further, the control controller 37 controls the focus detection unit controller 35 so as to acquire information on the focus state of the microscope 10, and, depending on the focus state thus acquired, gives instructions to the Z drive controller 13b to move the stage, to thereby enable auto-focus control for automatically bringing the object to be measured 11 into focus. Further, the user interface 39 is formed by including a keyboard and a display, so as to receive various inputs made to the host system and to display various measurement results and system information.

Further, the control controller 37 performs, under the control from the host system 38, ON/OFF switching of the automatic gain control, setting of gain, ON/OFF switching of the automatic exposure control, setting of exposure time, and the like of the camera unit 19, to thereby drive the camera unit 19 and control the image taking operation of the camera. The control controller 37 also controls the measurement view field, the measurement sites, and the number of measurements in obtaining a spectrum by the measurement unit 24, and the cumulative number and the number of light receiving elements 56a to be used, filter settings, and the like in the measurement.

Figure 2:
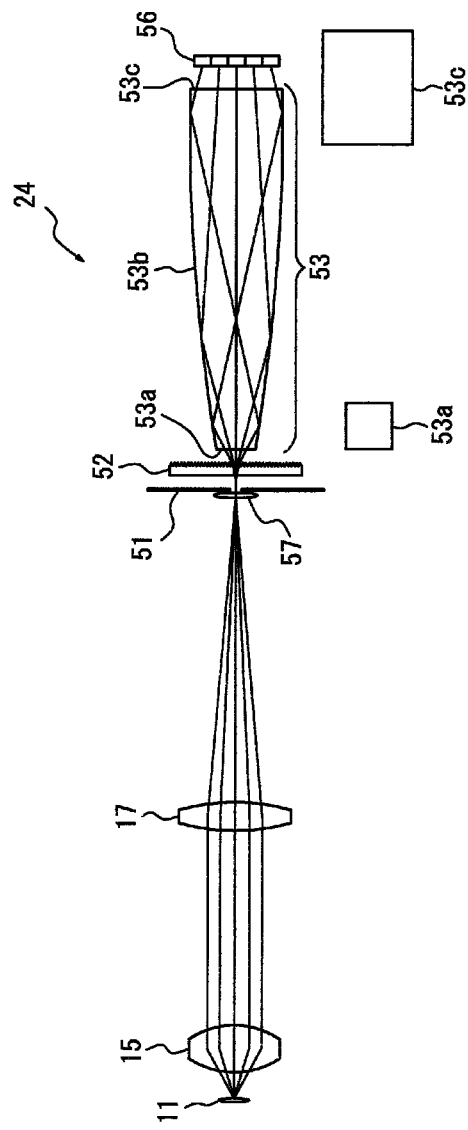
FIG. 2 is a diagram illustrating optical paths of light beams which have been generated from the object to be measured of FIG. 1 to lead up to an optical receiver.

Next, description is given of the measurement unit 24. FIG. 2 is a diagram illustrating optical paths of light beams which have been generated from the object to be measured 11 of FIG. 1 to lead up to an optical receiver 56 of the measurement unit 24. The measurement unit 24 is configured by including: a field stop 51; a diffuser plate 52; a light beam homogenizing optical element 53; and the optical receiver 56. In FIG. 2, an incidence plane 53a and an exit plane 53c of the light beam homogenizing optical element 53 are shown in cross-section below the light beam homogenizing optical element 53.

The field stop 51 is disposed at a position where an intermediate image 57 of the object to be measured 11 is formed by the objective lens 15 and the imaging lens 17. The field stop 51 is capable of confining a field of measurement on the object to be measured 11. Light beams that have passed through the field stop 51 are dispersed by the diffuser plate 52, and then pass through the light beam homogenizing optical element 53 so as to reach the optical receiver 56 as homogenized light. The diffuser plate 52 and the light beam homogenizing optical element 53 are described later.

Figure 3:
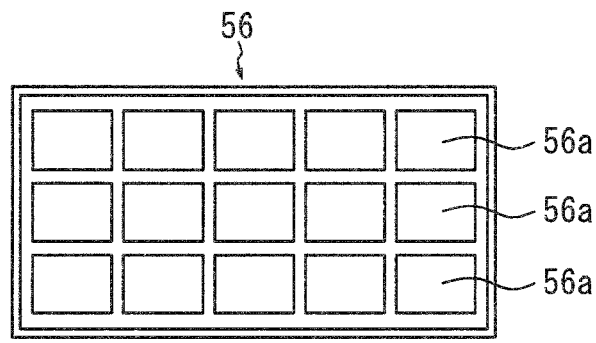
FIG. 3 is a diagram illustrating an example of the arrangement of light receiving elements in the optical receiver of FIG. 2.

The optical receiver 56 is configured by including a plurality (for example, four to 20 colors) of the light receiving elements 56a that are different from one another in spectral sensitivity. The light receiving elements 56a may be arranged in a row or may be arranged two-dimensionally on the light receiving surface. FIG. 3 is a diagram illustrating an example of the arrangement of the light receiving elements 56a of the optical receiver 56 of FIG. 2. In this case, the optical receiver 56 includes fifteen of the light receiving elements 56a, which are arranged in three rows and five columns, and the light receiving surface of the optical receiver 56 is rectangular in shape as a whole.

Figure 4:
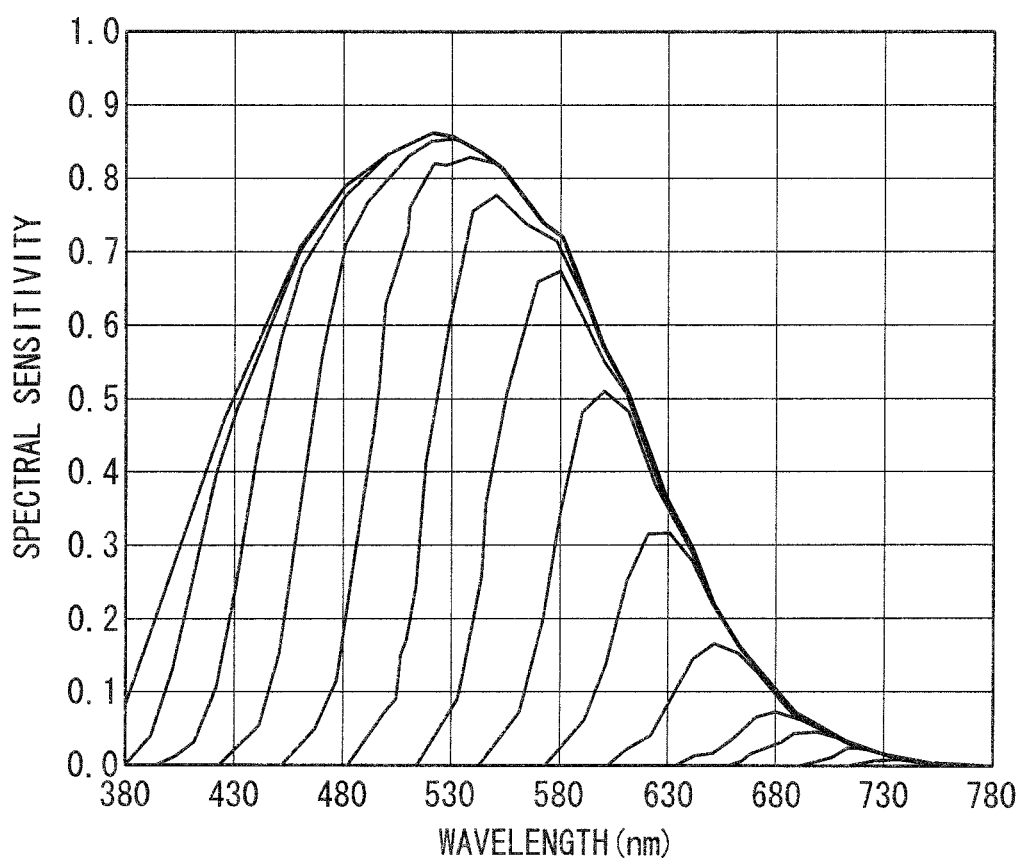
FIG. 4 is a graph illustrating an example of the spectral sensitivities of the light receiving elements of the optical receiver of FIG. 2.

Further, the light receiving elements 56a are configured by photoelectric conversion elements such as photodiodes (PD) which have organic film filters disposed on the front surface thereof, the organic film filters being different from one another in passband characteristics. FIG. 4 is a graph illustrating an example of the spectral sensitivities of the light receiving elements 56a of the optical receiver 56 of FIG. 2, with the abscissa showing the wavelength and the ordinate showing the spectral sensitivity. When this optical receiver 56 is employed, the difference between the signals of two light receiving elements 56a corresponding to graphs adjacent to each other is obtained, to thereby obtain signals (component characteristics) corresponding to the spectrums of 14 bands in total. The number of the light receiving elements 56a may be increased in order to obtain high measurement accuracy. On the other hand, in the case where high measurement accuracy is not required, the number of the light receiving elements 56a may be reduced, to thereby reduce the measurement time.

Figure 5:
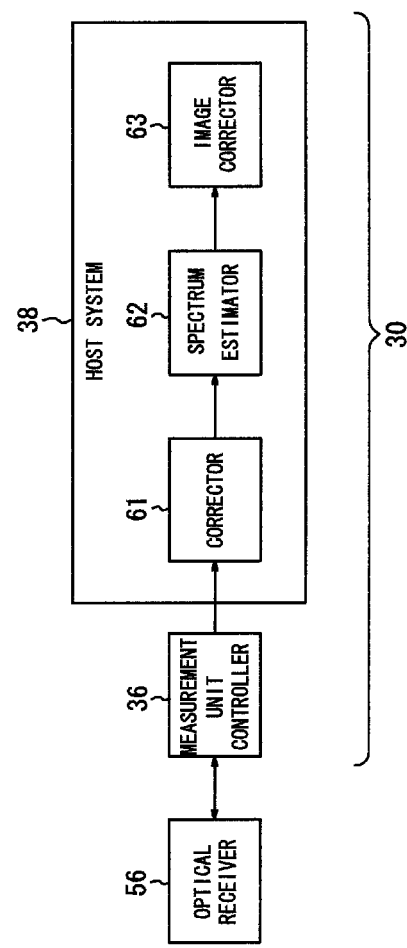
FIG. 5 is a block diagram for illustrating colorimetric processing in the microscope of FIG. 1.

FIG. 5 is a block diagram for illustrating colorimetric processing in the microscope of FIG. 1. The electric signals corresponding to the spectrum bands detected by the light receiving elements 56a of the optical receiver 56 are read out by the measurement unit controller 36 of the control/data processing section 30, and transferred to the host system 38. The host system 38 includes a corrector 61, a spectrum estimator 62, and an image corrector 63. The corrector 61 corrects data based on the optical unevenness of the light receiving elements 56a and the individual difference of the light receiving elements, and the spectrum estimator 62 makes estimation on color or spectrum, based on the data corrected by the corrector 61. The image corrector 63 corrects the color of an image obtained from the camera unit 19, based on the color or the spectrum estimated by the spectrum estimator 62. In this example, the corrector 61 and the spectrum estimator 62 correspond to a characteristic deriving unit.

Next, description is given of the diffuser plate 52 and the light beam homogenizing optical element 53. First, the diffuser plate 52 may employ, for example, a flat glass having one surface processed as a sand surface, or a glass plate having a light diffusion substance dispersed therein. The diffuser plate 52 serves to diverge the traveling direction of light that has passed through the field stop 51. In general, a microscope performs enlarged observation, and hence the intermediate image 57 becomes larger than the object to be measured 11. Accordingly, the angular range of light beams converging onto the intermediate image 57 becomes smaller than the angular range of the divergent light beams radiated from the object to be measured 11. Light beams passing through the field stop 51 approximate to parallel light beams along with the increase in magnification of the intermediate image. When such light beams are made incident directly on the incidence plane 53a of the light beam homogenizing optical element 53 without using the diffuser plate 52, light beams exit from the exit plane 53c and reach the optical receiver 56 without being reflected by the side surface 53b of the light beam homogenizing optical element 53. As a result, the illuminance distribution of the light beams is not homogenized, which causes deterioration in measurement accuracy of spectrum.

In view of the above, according to the present invention, the diffuser plate 52 is disposed between the field stop 51 and the light beam homogenizing optical element 53 as described above. Light beams that have passed through the field stop 51, which are approximate to parallel light beams, are scattered by the diffuser plate 52 so that divergent light beams are incident on the incidence plane 53a of the light beam homogenizing optical element 53. When the angular range of the light beams are thus increased, light beams passing through the light beam homogenizing optical element 53 are reflected in part by the side surface 53b once or a plurality of times so that light beams with homogenized illuminance distribution exit from the exit plane 53c of the light beam homogenizing optical element 53 and reach the optical receiver 56. In particular, in a microscope, when the object to be measured 11 is large in thickness or defocused, the angular distribution of illuminance of light beams also becomes non-homogenous in addition to the position distribution thereof. Even in such a case, the illuminance distribution of light beams to be radiated onto the optical receiver 56 can be homogenized, to thereby ensure measurement accuracy of spectrum.

The light beam homogenizing optical element 53 is an optically-transparent member formed of, for example, glass or plastics, and guides light beams incident from the incidence plane 53a to the exit plane 53c so as to cause the light beams to be exited therethrough while having the light beams reflected, at least in part thereof, by the side surface 53b. The light beam homogenizing optical element 53 has a shape which becomes larger from the incident side toward the exit side. That is, the exit plane 53c is larger in area than the incidence plane 53a. The reason thereof is as follows. In general, as an element for homogenizing light beams, there may be used a light pipe, which is a bar-like optical element such as a circular cylinder or a rectangular cylinder having a constant diameter. In such a case, divergent light beams from the diffuser plate 52 reach the optical receiver 56 while maintaining the angular range thereof. The optical receiver 56 is disposed as being spaced apart by a predetermined distance from the exit plane 53c of the light beam homogenizing optical element 53 due to mechanical constraint imposed by the arrangement of the cover glass or the like. As a result, part of the light beams escapes outside of the optical receiver 56, which reduces illuminance in the periphery of the optical receiver 56, leading to deterioration in measurement accuracy of spectrum.

In order to solve the above-mentioned problem, the side surface 53b of the light beam homogenizing optical element 53 is sloped at least in part thereof. The side surface 53b of this embodiment is formed of a curved surface, as illustrated in FIG. 2, in which a taper angle gradually decreases from the incidence plane 53a toward the exit plane 53c. However, it is not necessary to form the side surface 53b of a curved surface, and the side surface 53b may be formed of a planar surface.

Figure 6:
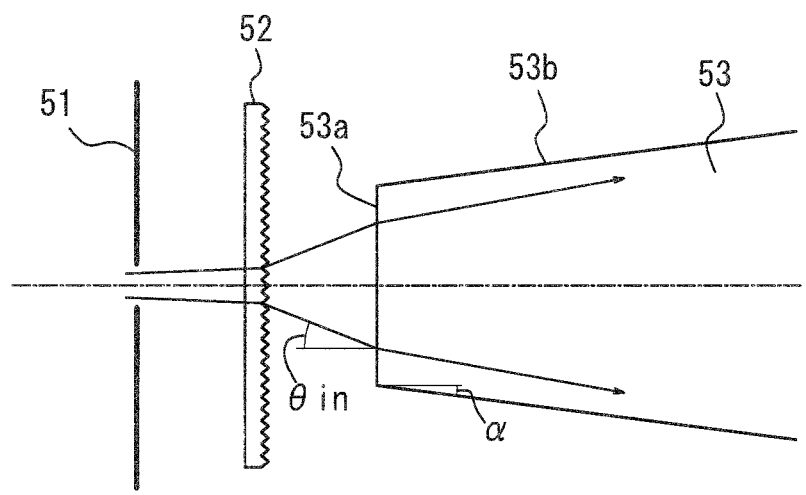
FIG. 6 is a diagram for illustrating a relation between a divergence angle of light beams incident on a light beam homogenizing optical element and a taper angle of the light beam homogenizing optical element.

FIG. 6 is a diagram for illustrating a relation between a divergence angle of light beams incident on the light beam homogenizing optical element 53 and a taper angle α of the light beam homogenizing optical element. When the light beam homogenizing optical element 53 satisfies the relation of $$a \sin(\sin \theta_{in}/n) > \alpha \quad (1),$$

in which: $\theta_{in}$ represents an angle of the intensity distribution at half width at half maximum relative to the divergence angle of light beams diffused by the diffuser plate 52; n represents the refractive index of the light beam homogenizing optical element 53; and α represents the taper angle of the light beam homogenizing optical element 53, most of the light beams are reflected more than once within the light beam homogenizing optical element 53 as long as the light beam homogenizing optical element 53 has an appropriate length.

Figure 7:
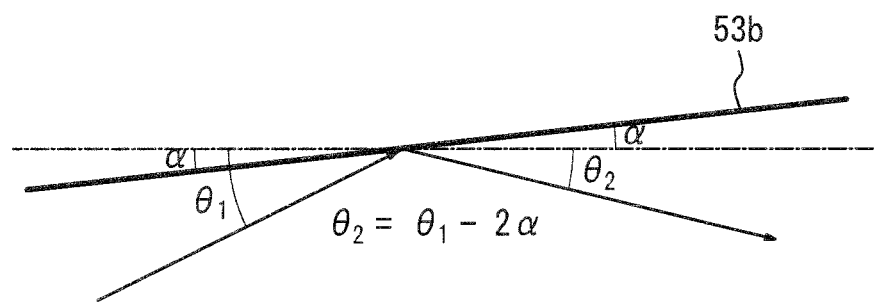
FIG. 7 is a diagram for illustrating angular variations resulting from internal reflection of light beams within the light beam homogenizing optical element

FIG. 7 is a diagram for illustrating the angular variation of light beams resulting from internal reflection within the light beam homogenizing optical element. The diagram is illustrated two-dimensionally for simplicity. Given that a light beam at an angle of $\theta_1$ relative to the optical axis is internally reflected by the side surface 53b of the light beam homogenizing optical element 53, the side surface 53b having a taper angle of α, so as to be reflected as a light beam at an angle of $\theta_2$ relative to the optical axis, the relation among α, $\theta_1$, and $\theta_2$ is defined by Expression (2):

$$\theta_2 = \theta_1 - 2\alpha \quad (2).$$

That is, each time the light beams are subjected to total reflection on the inside surface of the light beam homogenizing optical element 53, the angle of the light beams is reduced by 2α at a time so that the light beams approximate to parallel light beams. If the light beam homogenizing optical element 53 has a sufficient length, the angle of the light beams can be reduced to be smaller than the angle α. As a result, light beams exiting from the exit plane 53c become almost parallel to the perpendicular of the light receiving surface of the optical receiver 56, and hence, light beams escaping outside the optical receiver 56 can be reduced, to thereby minimize reduction in illuminance in the periphery of the optical receiver 56. As a result, the measurement accuracy of spectrum can be ensured. The optical axis extends in the same direction as the perpendicular of the light receiving surface of the optical receiver 56.

Next, a light beam which has been incident at an incident angle of $\theta_{in}$ and subjected to total reflection N times has a light beam angle of $\theta_{in}/-2N\alpha$ (in the case where a $\sin(\sin \theta_{in}/n)$ is approximated by $\theta_{in}/n$). Therefore, a light beam eventually refracted by the exit plane 53c of the light beam homogenizing optical element 53 has a light beam angle of $\theta_{in}-2nN\alpha$ (in the case where $\sin \theta_{in}$ is approximated by $\theta_{in}$), based on Snell's law. Here, given that a maximum angle of the light beams that have exited the light beam homogenizing optical element 53 to be radiated onto the light receiving element is defined as $\theta_{out}$, the following relation may desirably be satisfied:

$$\theta_{in} - 2nN\alpha < 2\theta_{out} \quad (3).$$

The left side of Expression (3) represents a beam angle obtained when a light beam at an angle of $\theta_{in}$ has exited from the light beam homogenizing optical element 53, and the right side is a two-fold maximum angle $\theta_{out}$ of the light beams radiated onto the light receiving surface of the optical receiver 56. The illuminance distribution can be reliably homogenized on the light receiving surface of the optical receiver 56 with the right side being $\theta_{out}$, but on an empirical basis, the illuminance distribution can still be substantially homogenized with the right side being equal to or smaller than $2\theta_{out}$. In this manner, the light beam homogenizing optical element 53 can be reduced in length, to thereby achieve a reduction in size of the optical system and homogenization of the illuminance distribution at the same time.

Further, the number N of reflections on the inside surface 53b of the light beam homogenizing optical element 53 may preferably be set to N=2 for the purpose of illuminance homogenization and size reduction of the optical system. If N is equal to or smaller than 1, the number of total reflections is too small to provide a sufficient effect of homogenizing illuminance. On the other hand, if N is equal to or larger than 3, the total length of the optical system is increased.

In order to cause total reflections twice within the light beam homogenizing optical element 53, the following relation may desirably be satisfied (provided that sin θ$_{in}$ and sin 3α are each approximated by θ$_{in}$ and 3α, respectively):

$$\theta_{out}/n > 3\alpha \quad (4)$$

The left side of Expression (4) is an angle of light beams that have been refracted by the incidence plane 53a of the light beam homogenizing optical element 53. As described above, this angle decreases by 2α each time the light beams are subjected to total reflection. Therefore, an angle of a light beam that does not satisfy Expression (4) becomes smaller, after being reflected once, than the taper angle α of the light beam homogenizing optical element 53, and therefore a second reflection does not occur.

According to Expressions (3) and (4), an appropriate range of θ$_{in}$ can be defined relative to α and θ$_{out}$ when N=2, the range allowing light beams to be reflected twice in the light beam homogenizing optical element 53 without excessively increasing the exit angle at the exit plane 53c.

As described above, according to this embodiment, light beams that have passed through the field stop 51 is dispersed by the diffuser plate to be made incident on the light beam homogenizing optical element, so that at least part of the light beams is reflected within the light beam homogenizing optical element by an sloped side surface in a direction approximating to the perpendicular of the light receiving element. As a result, the light beams are homogenized so as to reduce nonhomogeneity in illuminance at the optical receiver 56 including the periphery thereof, which leads to an increase in measurement accuracy of wavelength distribution.

Further, the light receiving elements 56a, which are arranged two-dimensionally, are capable of detecting light corresponding to a larger number of component characteristics, that is, spectrum bands, as compared to those arranged one-dimensionally. Further, the optical system includes a smaller number of components and is simple in configuration, which allows easy assembly at low cost.

In the above-mentioned embodiment, the imaging lens 17 is not limited to be disposed between the half mirror 20 and the half mirror 22. For example, imaging lenses each may be provided between the half mirror 22 and the mirror 23, and between the half mirror 22 and the eyepiece 18 or the camera unit 19.

Further, the diffuser plate 52 may be substituted by another optical element as long as capable of providing the effect of expanding the angular range of the incident light beams. For example, an optical element using optical diffraction (such as a diffraction grating, a HOE, and the like), and an optical element using optical refraction (such as a lens, a lens array, a Fresnel lens, and the like) may be employed as substitutes.

Second Embodiment

Figure 8:
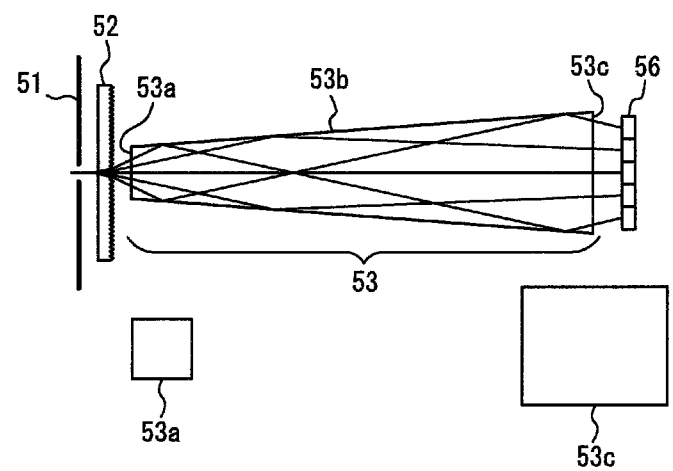
FIG. 8 is a diagram illustrating, along with optical paths of light beams, a schematic configuration of a wavelength distribution measuring apparatus according to a second embodiment of the present invention.

FIG. 8 is a diagram illustrating, along with optical paths of light beams, a schematic configuration of a wavelength distribution measuring apparatus according to a second embodiment of the present invention. The wavelength distribution measuring apparatus is applied to a microscope, similarly to the first embodiment. However, FIG. 8 merely illustrates a configuration from the field stop 51 to the optical receiver 56 without illustrating the microscope, because the microscope is similar to that of the first embodiment. In FIG. 8, the incidence plane 53a and the exit plane 53c of the light beam homogenizing optical element 53 are shown in cross-section below the light beam homogenizing optical element 53.

In the light beam homogenizing optical element 53 of FIG. 8, the exit plane 53c is larger in area than the incidence plane 53a, and the side surface 53b is formed of a plurality of planar surfaces. According to the configuration illustrated in FIG. 8, the incidence plane 53a and the exit plane 53c are both rectangular in shape, and hence, the side surface 53b is formed of four planar surfaces connecting the vertexes of the incidence plane 53a and the exit plane 53c facing each other.

With this configuration, the side surface 53b is configured as being sloped so that light beams exiting from the exit plane 53c can be approximated to parallel light beams, which reduces light beams escaping outside of the optical receiver 56, to thereby suppress illuminance reduction in the periphery of the optical receiver 56, with the result that the measurement accuracy of spectrum can be ensured. Further, the side surface 53b, which is formed of a plurality of plane surfaces, is easy to polish, which improves workability of the light beam homogenizing optical element 53.

Third Embodiment

Figure 9:
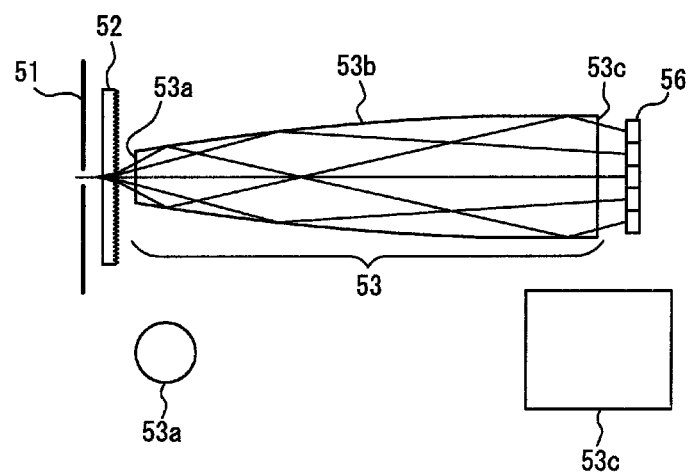
FIG. 9 is a diagram illustrating, along with optical paths of light beams, a schematic configuration of a wavelength distribution measuring apparatus according to a third embodiment of the present invention.

FIG. 9 is a diagram illustrating, along with optical paths of light beams, a schematic configuration of a wavelength distribution measuring apparatus according to a third embodiment of the present invention. Similarly to FIG. 8 illustrating the second embodiment, FIG. 9 illustrates a configuration from the field stop 51 to the optical receiver 56. In FIG. 9, the incidence plane 53a and the exit plane 53c of the light beam homogenizing optical element 53 are also shown in cross-section below the light beam homogenizing optical element 53.

In the light beam homogenizing optical element 53 of FIG. 9, the exit plane 53c is larger in area than the incidence plane 53a, and the incidence plane 53a is circular in shape and the exit plane 53c is rectangular in shape. Further, the cross-section of the optical receiver 56 parallel to the light receiving surface of the optical receiver 56 continuously changes from a circular shape to a rectangular shape from the incidence plane 53a toward the exit plane 53c.

In general, a field of measurement in a microscope or the like is often defined as a circle, and hence the field stop 51 is also configured as circular in shape in many cases. In this case, divergent light beams from a circular surface light source may be regarded as being incident on the light beam homogenizing optical element 53 via the diffuser plate 52. Therefore, light beams incident on the incidence plane 53a of the light beam homogenizing optical element 53 are circular in shape. Here, with the incidence plane 53a of the light beam homogenizing optical element 53 being formed circular in shape, light beams can reach the side surface 53b along a shorter optical path, as compared to a case where the incidence plane is formed rectangular in shape which has a side equal in length to the diameter of the circular incidence plane 53a, with the result that the total length of the light beam homogenizing optical element 53 can be reduced. As a result, the device can be further reduced in size.

Meanwhile, the optical receiver 56 is generally rectangular in shape. In view of this, the exit plane 53c of the light beam homogenizing optical element is formed rectangular in shape, so that substantially all the light beams incident from the incidence plane 53a are exited from the exit plane 53c, without generating a loss in the amount of light despite the difference in shape between the field of measurement and the optical receiver 56. With this configuration, light beams escaping outside the optical receiver 56 can be reduced, to thereby maintain high illuminance at the optical receiver 56 making it possible to ensure the measurement accuracy of spectrum.

Modified Example

Figure 10:
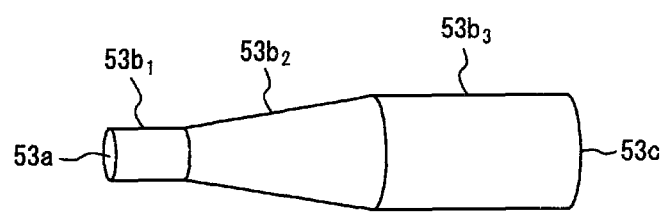
FIG. 10 is a perspective view of a light beam homogenizing optical element according to a first modified example of the present invention.
Figure 11:
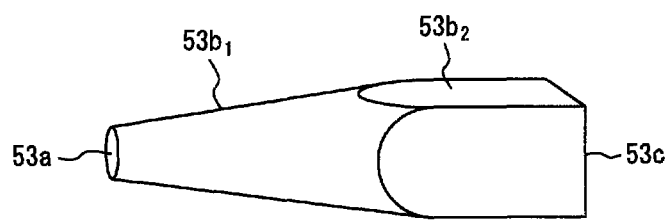
FIG. 11 is a perspective view of a light beam homogenizing optical element according to a second modified example of the present invention.
Figure 12:
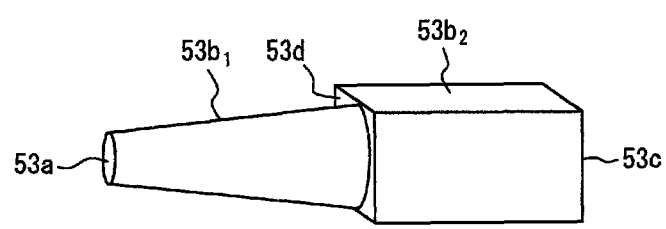
FIG. 12 is a perspective view of a light beam homogenizing optical element according to a third modified example of the present invention.

FIGS. 10 to 12 each are a perspective view of the light beam homogenizing optical element 53 according to a first modified example, a second modified example, and a third modified example, respectively, of the present invention. These modified examples are similar in configuration to the first embodiment, except in that each employs a light beam homogenizing optical element which is different in shape from those of the first to third embodiment.

The light beam homogenizing optical element 53 of FIG. 10 has the incidence plane 53a and the exit plane 53c which are circular in shape, and the exit plane 53c is larger in area than the incidence plane 53a. The light beam homogenizing optical element 53 has a side surface formed of three portions $53b_1$, $53b_2$, and $53b_3$. Here, the side surfaces $53b_1$ and $53b_3$ are each in a cylindrical side shape, and the side surface $53b_2$ is in a truncated conical side shape which is larger on the exit plane 53c side than the incidence plane 53a side. In this case, the cross-section (the diameter of the circle in this case) of the light beam homogenizing optical element 53 vertical to the perpendicular of the light receiving surface continuously changes between the incidence plane 53a and the exit plane 53c. Even when only the side surface $53b_2$ as part of the side surface is sloped relative to the optical axis as described above, light beams passing through the light beam homogenizing optical element 53 are reflected in part by the side surface $53b_2$, so that the direction of the light beams approximate to the direction of the perpendicular of the light receiving surface of the optical receiver 56, to thereby obtain the same effect as in the first embodiment.

The light beam homogenizing optical element 53 of FIG. 11 has the incidence plane 53a which is circular in shape and the exit plane 53c which is rectangular in shape. Further, the exit plane 53c is larger in area than the incidence plane 53a. The light beam homogenizing optical element 53 has a side surface formed of two portions $53b_1$ and $53b_2$. Here, the side surface $53b_1$ is in a circular truncated conical side shape which is larger on the exit plane 53c side than the incidence plane 53a side, and the side surface $53b_2$ is in a quadrangular prism side shape. Again, in this case, the cross-section of the light beam homogenizing optical element 53 parallel to the light receiving surface continuously changes between the incidence plane 53a and the exit plane 53c, and the same effect as in the first embodiment can also be obtained in this case. Further, the light beam homogenizing optical element 53 can be formed of a conical member having a portion on the bottom surface side cut out into a quadrangular prism shape, and therefore is easy to manufacture. Alternatively, the light beam homogenizing optical element 53 can also be formed of a quadrangular prism having a portion on one end side in the longitudinal direction cut out into a circular truncated cone shape.

The light beam homogenizing optical element 53 of FIG. 12 has the incidence plane 53a which is circular in shape and the exit plane 53c which is rectangular in shape. Further, the exit plane 53c is larger in area than the incidence plane 53a. The light beam homogenizing optical element 53 has a side surface formed of two portions $53b_1$ and $53b_2$. Here, the side surface $53b_1$ is in a circular truncated conical side shape which is larger on the exit plane 53c side than the incidence plane 53a side, and the side surface $53b_2$ is in a quadrangular prism side shape. The circular truncated cone portion (first portion) and the rectangular prism portion (second portion) of the light beam homogenizing optical element 53 are connected to each other across a step 53d. The same effect as in the first embodiment can be obtained in this case as well.

It should be noted that the present invention is not limited to the above-mentioned embodiments, and may be subjected to various modifications and alterations. For example, the light beam homogenizing optical element may be in various forms other than those exemplified in the above-mentioned embodiments and examples. For example, the incidence plane and the exit plane of the light beam homogenizing optical element are not limited to those that are circular and rectangular in shape, and may be, for example, triangular, square, pentagonal, and hexagonal in shape.

Further, the light beam homogenizing optical element is configured as an optical member formed of, for example, glass or plastics, and light beams are subjected to total reflection on the inside surface thereof. However, the present invention is not limited thereto. For example, the light beam homogenizing optical element may be configured as a hollow member having the incidence plane and the exit plane formed as openings and the inside surface formed of a mirror.

Further, the application of the wavelength distribution measuring apparatus according to the present invention is not limited to a microscope, and the present invention may also be applied to a standalone colorimeter or to a part of another device that requires measurement of wavelength distribution. Further, light beams from the object to be measured may be directly measured, without the need to form an intermediate image as in the first embodiment.

DESCRIPTION OF SYMBOLS 10 microscope
11 object to be measured
12 stage
13 stage unit
13a XY drive controller
13b Z drive controller
14 light source unit
15 objective lens
16 revolver unit
17 imaging lens
18 eyepiece
19 camera unit
20 half mirror
21 focus detection unit
22 half mirror
23 mirror
24 measurement unit
30 control/data processing section
31 stage unit controller
32 light source unit controller
33 revolver unit controller
34 camera unit controller
35 focus detection unit controller
36 measurement unit controller
37 control controller
38 host system
39 user interface
51 field stop
52 diffuser plate
53 light beam homogenizing optical element
53a incidence plane
53b side surface
53c exit plane
56 optical receiver 56a light receiving element
57 intermediate image of object to be measured
61 corrector
62 spectrum estimator
63 image corrector

The invention claimed is:

1. A wavelength distribution measuring apparatus comprising:
a diffuser plate for dispersing light beams radiated from a field of measurement;
an optical receiver comprising:
a light receiving surface; and
a plurality of light receiving elements disposed on the light receiving surface, the plurality of light receiving elements being different from one another in spectral sensitivity characteristic; and
a light beam homogenizing optical element comprising:
an incidence plane on which the light beams dispersed by the diffuser plate is incident;
an exit plane through which the light beams incident from the incidence plane is exited toward the optical receiver; and
a side surface for internally reflecting at least part of the light beams incident from the incidence plane,
wherein the side surface comprises a tapered portion in which cross-section vertical to the perpendicular of the optical receiver is larger on the exit plane side than the incidence plane side.

2. The wavelength distribution measuring apparatus according to claim 1, wherein the side surface of the light beam homogenizing optical element is formed of, at least in part thereof, a planar surface.

3. The wavelength distribution measuring apparatus according to claim 1, wherein at least part of the side surface of the light beam homogenizing optical element is parallel to the direction of the perpendicular of the optical receiver.

4. The wavelength distribution measuring apparatus according to claim 1, wherein the light beam homogenizing optical element continuously is changed in shape in cross-section parallel to the optical receiver, between the incidence plane and the exit plane.

5. The wavelength distribution measuring apparatus according to claim 1, wherein the light beam homogenizing optical element is formed of at least a first portion and a second portion which are connected to each other across a step.

6. The wavelength distribution measuring apparatus according to claim 1, wherein the light receiving elements of the optical receiver are arranged two-dimensionally.

7. The wavelength distribution measuring apparatus according to claim 1, wherein the light receiving elements are comprised of photoelectric conversion elements and filters disposed in proximity to the front surface of the photoelectric conversion elements, the filters being different from one another in passband characteristics.

8. The wavelength distribution measuring apparatus according to claim 1, further comprising a characteristic deriving unit for deriving wavelength characteristics of the light beams, based on output signals from the respective light receiving elements.

9. The wavelength distribution measuring apparatus according to claim 1,
wherein the side surface of the light beam homogenizing optical element satisfies the following relation:

$$a \sin(\sin \theta_{in}/n) > \alpha > 0,$$

in which $\theta_{in}$ represents an angle between at least part of the light beams incident from the incidence plane and the perpendicular of the optical receiver, n represents a refractive index of the light beam homogenizing optical element, and $\alpha$ represents an angle between the side surface and the perpendicular of the optical receiver.

10. The wavelength distribution measuring apparatus according to claim 1,
wherein the side surface of the light beam homogenizing optical element satisfies the following relation:

$$a \sin(\sin \theta_{in}/n) > 3\alpha > 0,$$

in which $\theta_{in}$ represents an angle between at least part of the light beams incident from the incidence plane and the perpendicular of the optical receiver, n represents a refractive index of the light beam homogenizing optical element, and a represents an angle between the side surface and the perpendicular of the optical receiver.

11. The wavelength distribution measuring apparatus according to claim 1,
wherein the incidence plane of the light beam homogenizing optical element is circular in shape, and
wherein the exit plane of the light beam homogenizing optical element is rectangular in shape.

12. The wavelength distribution measuring apparatus according to claim 1,
wherein the side surface consists only of the tapered portion, and
wherein the exit plane is rectangular in shape.

* * * * *